Aug. 14, 1945. L. A. CROCKER 2,382,209
BUFFING RASP AND METHOD OF MAKING SAME
Filed March 14, 1944
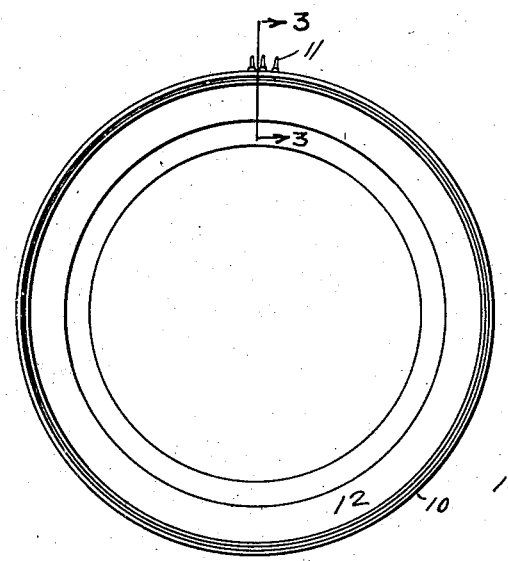
Fig. 1
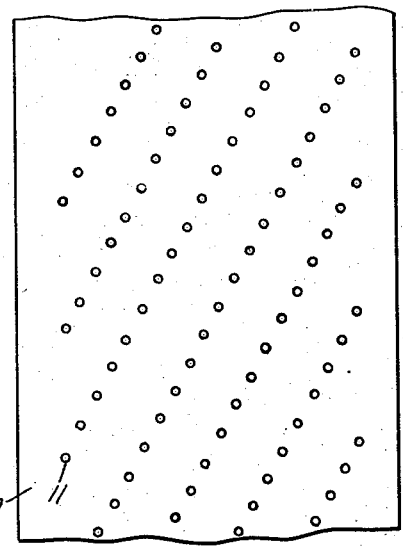
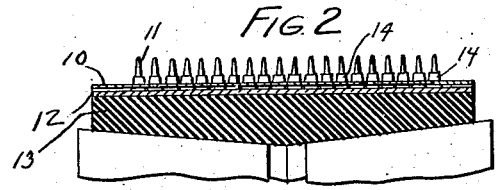
Fig. 2
Fig. 3
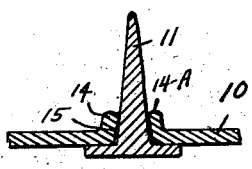
Fig. 4
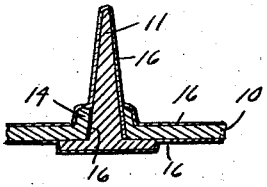
Fig. 5
INVENTOR
LUTHER A. CROCKER
BY
ATTORNEY Patented Aug. 14, 1945

2,382,209

UNITED STATES PATENT OFFICE 2,382,209

BUFFING RASP AND METHOD OF MAKING SAME

Luther A. Crocker, Portland, Oreg.

Application March 14, 1944, Serial No. 526,460

4 Claims. (Cl. 29—78)

This invention relates generally to the rubber tire industry and particularly to a buffing rasp.

The main object of this invention is to produce a tire rasp which will outwear existing forms of rasps of the same type and materially reduce the cost of replacement.

I accomplish these objects in the manner set forth in the following specification as illustrated in the accompanying drawing, in which Fig. 1 is a side elevation of the rasp.

Fig. 2 is a fragmentary development of the rasp surface.

Fig. 3 is a section taken along the line 3—3 in Fig. 1.

Fig. 4 is an enlarged section showing one of the tack units before being improved.

Fig. 5 is a view similar to Fig. 4 showing one of the tack units in its improved form.

Similar numerals refer to similar parts throughout the several views.

Referring in detail to the drawing, there is shown a common form of buffing rasp composed of an outer metal band 10 through which are projected a plurality of tacks 11, and which are held in place by a split inner band 12 which is expanded by pressure exerted against the rubber bushing 13. Such rasps are now in common use, employed in cutting down the treads of rubber tires preparatory to retreading.

In the production of these rasps, it is the common practice to first pierce the holes for the tacks 11 in which the metal 14 forms a limited amount of support for the tack 11. Owing to the fact that the exterior of the tack 11 is relatively rough and tacks of this type vary considerably in size and shape, and also owing to the fact that the manner of forming the holes 15 for the tacks 11 causes the metal 14 to be shaped somewhat irregularly and the edge 16 of the metal 14 to be somewhat torn and rough, it follows that when the tack 11 is inserted in the hole 15 it may fit tightly or loosely, but seldom makes contact at more than three points, therefore, when the rasp is used to cut rubber at the high speed at which such devices are commonly operated, the tacks soon loosen causing a stroking action to the tack instead of a cutting action, thereby subjecting the tack to a greater wear and early collapse.

The problem, then, is to hold the tack radially and also to enable it to resist lateral wear. I accomplish this by chromium plating the finished rasp, that is the rim 10 with the tacks 11 inserted, before inserting the inner band 12.

In Fig. 4 it will be seen that there are numerous voids between the tack 11 and the side of the hole 15, but in Fig. 5 these voids are filled by the plating action in which chromium is deposited on the sides of the hole 15 and over the surface of the tack 11. The result is more than might be expected. It not only protects the rasp against corrosion and improves its appearance, but mainly contributes to the support of the tacks in a manner to hold them radial and thereby reduces the amount of wear on the side of the tack 11, and in addition thereto, better enables the tack 11 to resist such wear as is directed against it. By actual test, these chromium plated rasps have increased the operating life of the rasp at least three-fold and after cutting three times as much area of rubber as did an unplated rasp, the tacks in the plated rasp were still firm and only a fraction of them were broken as compared with the unplated rasp.

While I have thus illustrated and described my invention, it is not my desire to be limited to the details shown herein, but it is to cover all such forms and modifications as fall fairly within the appended claims.

I claim:

1. A buffing rasp consisting of a perforated cylindrical outer band, tacks projecting outwardly through said perforated band with the heads of the tacks engaged in the interior of the band, a coating of chromium covering the exterior of the tacks and filling any voids existing between said tacks and the interior of the perforations and split inner band engaging the head of the tacks.

2. A buffing rasp consisting of a revolvable metal cylinder outwardly flared tack openings formed therein, tacks projecting outwardly through said openings, said tack openings and the tack exteriors having relatively rough surfaces and having voids around their adjacent faces and a chromium facing for said tacks and openings filling the voids therein.

3. A method of forming buffing rasps consisting of progressively perforating a strip of metal to form flared perforations therein, then inserting tacks into said perforations with the points projecting through the flared end thereof, then forming the strip into a continuous cylinder, then plating the rasp to cover the exterior of the tacks as well as the interior of the perforations in a manner to fill the voids existing around said tacks and insure against the rusting thereof.

4. A method of forming buffing rasps consisting of forming a metal cylinder and perforating said cylinder in a manner to extrude the metal thereof outwardly, then placing tacks within said perforations with the points projecting from the extruded end, then chromium plating the cylinder and tacks for the purpose of protecting the tack against wear and establishing a rigid relationship to said cylinder.

LUTHER A. CROCKER.